(12) United States Patent
Iwano

(10) Patent No.: US 8,991,898 B2
(45) Date of Patent: Mar. 31, 2015

(54) OPENING/CLOSING BODY STRUCTURE FOR VEHICLE

(75) Inventor: Yoshihiro Iwano, Toyota (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/347,464

(22) PCT Filed: Aug. 28, 2012

(86) PCT No.: PCT/JP2012/071721
§ 371 (c)(1),
(2), (4) Date: Mar. 26, 2014

(87) PCT Pub. No.: WO2013/051352
PCT Pub. Date: Apr. 11, 2013

(65) Prior Publication Data
US 2014/0210230 A1    Jul. 31, 2014

(30) Foreign Application Priority Data
Oct. 5, 2011    (JP) .................. 2011-221385

(51) Int. Cl.
*B62D 25/24* (2006.01)
*B60J 10/00* (2006.01)
*B60J 5/04* (2006.01)
*B60J 5/10* (2006.01)

(52) U.S. Cl.
CPC ............ *B60J 10/0091* (2013.01); *B60J 5/0429* (2013.01); *B60J 5/101* (2013.01); *B60J 5/0431* (2013.01); *B60J 5/0433* (2013.01)
USPC .................................................. 296/146.6

(58) Field of Classification Search
CPC ......... B60J 5/101; B60J 5/0431; B60J 5/0433
USPC .................. 296/56, 76, 146.6, 146.8; 49/503
See application file for complete search history.

(56) References Cited

U.S. PATENT DOCUMENTS

| | | | |
|---|---|---|---|
| 2002/0024234 A1* | 2/2002 | Ishikawa et al. ........... | 296/146.8 |
| 2008/0030047 A1* | 2/2008 | Munenaga et al. ......... | 296/146.6 |
| 2011/0074179 A1 | 3/2011 | Kuntze et al. | |
| 2012/0098294 A1* | 4/2012 | Dancasius et al. ......... | 296/146.6 |

FOREIGN PATENT DOCUMENTS

| | | |
|---|---|---|
| JP | A-2001-260779 | 9/2001 |
| JP | A-2002-046472 | 2/2002 |
| JP | A-2002-362413 | 12/2002 |
| JP | A-2003-312560 | 11/2003 |
| JP | A-2005-153554 | 6/2005 |

(Continued)

*Primary Examiner* — Lori L Lyjak
(74) *Attorney, Agent, or Firm* — Oliff PLC

(57) ABSTRACT

To provide an opening/closing body structure for a vehicle that can improve the fitting performance of an opening/closing body for a vehicle. A lock reinforcement is fixed to a lock mechanism mounting portion at a door inner panel. A pair of left and right hinge reinforcements are fixed to regions from left and right upper end portions to lower portions at vehicle transverse direction outer side end portions at an outer peripheral portion of the door inner panel. At wires, whose mounting portions at one end sides thereof are fixed to the lock reinforcement, mounting portions at other end sides are fixed to vertical direction intermediate portions of the hinge reinforcements, and the wires are tensed rectilinearly.

4 Claims, 9 Drawing Sheets

(56) References Cited

FOREIGN PATENT DOCUMENTS

| JP | A-2007-008267 | 1/2007 |
| JP | A-2007-076609 | 3/2007 |
| JP | A-2008-094141 | 4/2008 |
| JP | A-2009-045995 | 3/2009 |
| JP | A-2009-179290 | 8/2009 |
| JP | A-2010-100226 | 5/2010 |
| JP | A-2010-159037 | 7/2010 |
| JP | A-2010-247676 | 11/2010 |
| JP | A-2011-051544 | 3/2011 |
| JP | A-2011-057119 | 3/2011 |

* cited by examiner

FIG.1
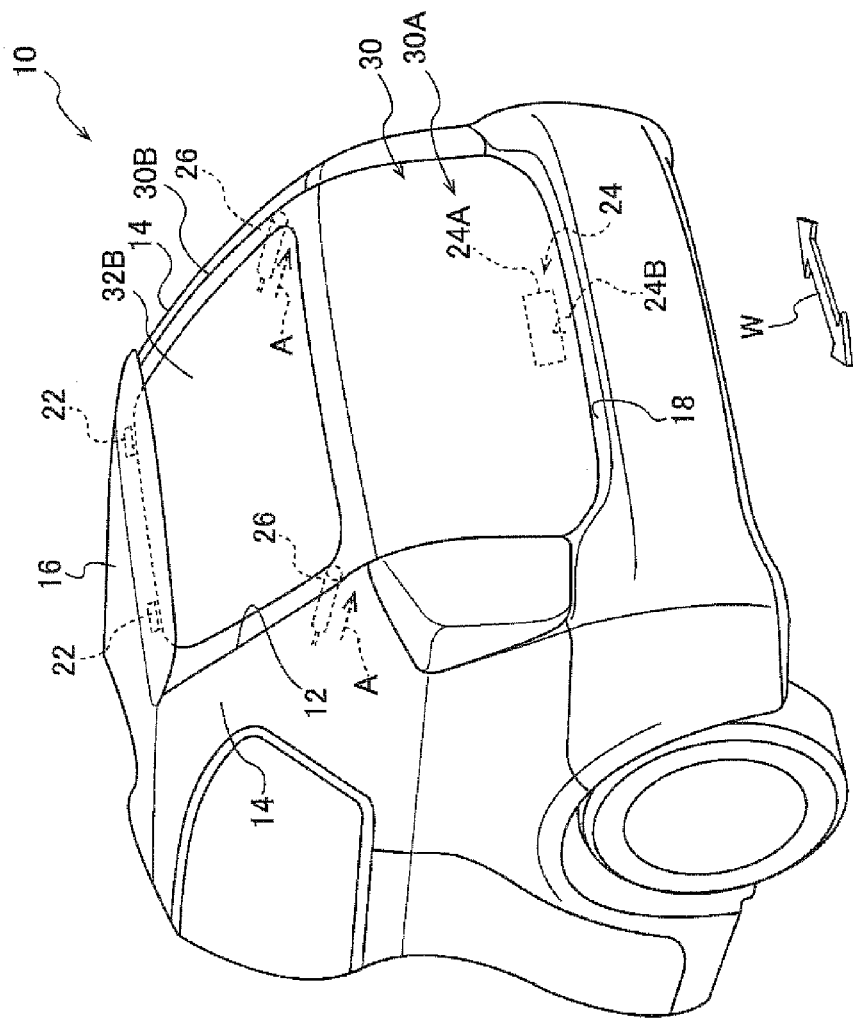
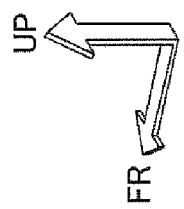

REAR ← → FRONT

TOP ← → BOTTOM

TRANSUERSE DIRECTION PORTION

OPENING/CLOSING BODY STRUCTURE FOR VEHICLE

TECHNICAL FIELD

The present invention relates to an opening/closing body structure for a vehicle.

BACKGROUND ART

At a back door that is an example of an opening/closing body for a vehicle, the closed state of the door is maintained due to the lower end portion of the door being locked (see, for example, Patent Document 1).

PRIOR ART DOCUMENTS

Patent Documents

[Patent Document 1] Japanese Patent Application Laid-Open (JP-A) No. 2010-159037

SUMMARY OF INVENTION

Technical Problem

However, in this structure, in a case in which the rigidity of a door inner panel that structures a door inner plate is low, if the reinforcing of the door inner panel is insufficient, there are cases in which the fitting performance of the back door cannot be ensured well.

In consideration of the above-described circumstances, an object of the present invention is to provide an opening/closing body structure for a vehicle that can improve the fitting performance of an opening/closing body for a vehicle.

Solution to Problem

An opening/closing body structure for a vehicle relating to a first aspect of the present invention comprises: a door inner panel that structures an inner plate of an opening/closing body that can open and close a vehicle body opening portion; door hinges that are provided at a base end portion, which is a side mounted to a vehicle body, of the opening/closing body, and that connect the opening/closing body and the vehicle body; a door lock mechanism that is provided at a free end portion, which is at a side opposite from the side mounted to the vehicle body, of the opening/closing body, and that anchors the opening/closing body to the vehicle body; a first reinforcing body that is provided at the free end portion side of the opening/closing body, and that reinforces a mounting portion of the door lock mechanism at the door inner panel; second reinforcing bodies that are provided at both end portions sides, in a direction orthogonal to a direction heading from the base end portion side toward the free end portion side, of the opening/closing body, and that reinforce the both end portion sides of the door inner panel; and having whose one end portions that are fixed to the first reinforcing body, and other end portions that are fixed to the second reinforcing bodies, and being tensioned rectilinearly.

In accordance with the opening/closing body structure for a vehicle relating to the first aspect of the present invention, the mounting portion of the door lock mechanism at the door inner panel is reinforced by the first reinforcing body that is provided at the free end portion side of the opening/closing body. Due to the second reinforcing bodies that are provided at both end portion sides in the direction orthogonal to the direction heading from the base end portion side toward the free end portion side at the opening/closing body, these both end portion sides of the door inner panel are reinforced. Here, at the wires having one end portions that are fixed to the first reinforcing body, the other end portions that are fixed to the second reinforcing bodies, and the wires are tensed rectilinearly. Therefore, at the door inner panel, the relative positions of the fixed region of the first reinforcing body and the fixed regions of the second reinforcing bodies are maintained by the wires. Accordingly, in a case in which the opening/closing body is closed and is anchored to the vehicle body by the door lock mechanism, positional offset of the free end portion of the door inner panel is suppressed.

In a second aspect of the present invention, in the opening/closing body structure for a vehicle relating to the first aspect, the opening/closing body is a back door that can open and close a back door opening portion of a vehicle rear portion, and has left and right upper end portions that are mounted to a vehicle body upper portion by the door hinges, a vehicle transverse direction intermediate portion of a lower end portion thereof being anchored to a vehicle body lower portion by the door lock mechanism, and, in a closed state, vehicle transverse direction both end portions of a vertical direction intermediate portion thereof being urged toward a vehicle cabin outer side by dampers; the first reinforcing body is a lock reinforcement that is fixed to a lower end portion of the door inner panel; the second reinforcing bodies are a pair of left and right hinge reinforcements that are fixed to regions from left and right upper end portions to lower portions of vehicle transverse direction outer side end portions at an outer peripheral portion of the door inner panel, and that reinforce mounting portions of the door hinges at left and right upper end portions of the door inner panel; and the other end portions of the wires are fixed to vertical direction intermediate portions of the hinge reinforcements.

In accordance with the opening/closing body structure for a vehicle relating to the second aspect of the present invention, the left and right upper end portions of the back door that serves as the opening/closing body are mounted to the vehicle body upper portion by the door hinges. The vehicle transverse direction intermediate portion of the lower end portion of the back door is anchored to the vehicle body lower portion by the door lock mechanism. In the closed state of the back door, the vehicle transverse direction both end portions of the vertical direction intermediate portion of the back door are urged toward the vehicle cabin outer side by dampers. Therefore, in the closed state of the back door, force, that attempts to bendingly deform the door inner panel in a sideways V-shape as seen in a vehicle side view, is applied to the door inner panel that structures the inner plate of the back door.

Here, the pair of left and right hinge reinforcements, that serve as the second reinforcing bodies, are fixed to regions from the left and right upper end portions to the lower portions of the vehicle transverse direction outer side end portions at the outer peripheral portion of the door inner panel, and the pair of left and right hinge reinforcements reinforce the mounting portions of the door hinges at the left and right upper end portions of the door inner panel and the left and right both side portions of the door inner panel. Therefore, bending deformation, in a sideways V-shape as seen in a vehicle side view, of the door inner panel is suppressed. Further, the lock reinforcement, that serves as the first reinforcing body, is fixed to the lower end portion of the door inner panel, and reinforces this lower end portion. At the wires whose one end portions are fixed to this lock reinforcement, the other end portions are fixed to the vertical direction intermediate portions of the hinge reinforcements, and the wires are tensed rectilinearly. Therefore, at the door inner panel, the relative positions of the fixed region of the lock reinforcement and the fixed regions of the pair of left and right hinge reinforcements are maintained by the wires. Accordingly, in a case in which the back door is closed and is anchored to the vehicle body lower portion by the door lock mechanism, positional offset of the lower end portion of the door inner panel in the vehicle longitudinal direction is suppressed.

In a third aspect of the present invention, in the opening/closing body structure for a vehicle relating to the second aspect, at the door inner panel, mounting portions of the dampers are set substantially on extension lines of rectilinear portions of the wires as seen from a front elevational view of the back door.

In accordance with the opening/closing body structure for a vehicle relating to the third aspect of the present invention, when, in the closed state of the back door, tension is applied between the mounting portions of the dampers at the door inner panel and the mounting portion of the door lock mechanism due to the urging forces of the dampers, this tension is basically applied along the axial directions of the rectilinear portions of the wires, without bypassing through the outer peripheral portion of the door inner panel. Therefore, even if the reinforced range of the lower portion side of the door inner panel by the hinge reinforcements is kept small, in a case in which the back door is closed and is anchored to the vehicle body lower portion by the lock mechanism, positional offset of the lower end portion of the door inner panel in the vehicle longitudinal direction is suppressed well.

Advantageous Effects of Invention

As described above, in accordance with the opening/closing body structure for a vehicle relating to the first aspect of the present invention, there is the excellent effect that the fitting performance of an opening/closing body for a vehicle can be improved.

In accordance with the opening/closing body structure for a vehicle relating to the second aspect of the present invention, there is the excellent effect that the fitting performance of a back door can be improved.

In accordance with the opening/closing body structure for a vehicle relating to the third aspect of the present invention, there is the excellent effect that, even if the reinforced range of the lower portion side of a door inner panel by hinge reinforcements is kept small, the fitting performance of the back door can be improved.

BRIEF DESCRIPTION OF DRAWINGS

FIG. 1 is a perspective view showing a vehicle rear portion that includes a back door to which an opening/closing body structure for a vehicle relating to an embodiment of the present invention is applied.

DESCRIPTION OF EMBODIMENTS (Structure of Embodiment)

Figure 2:
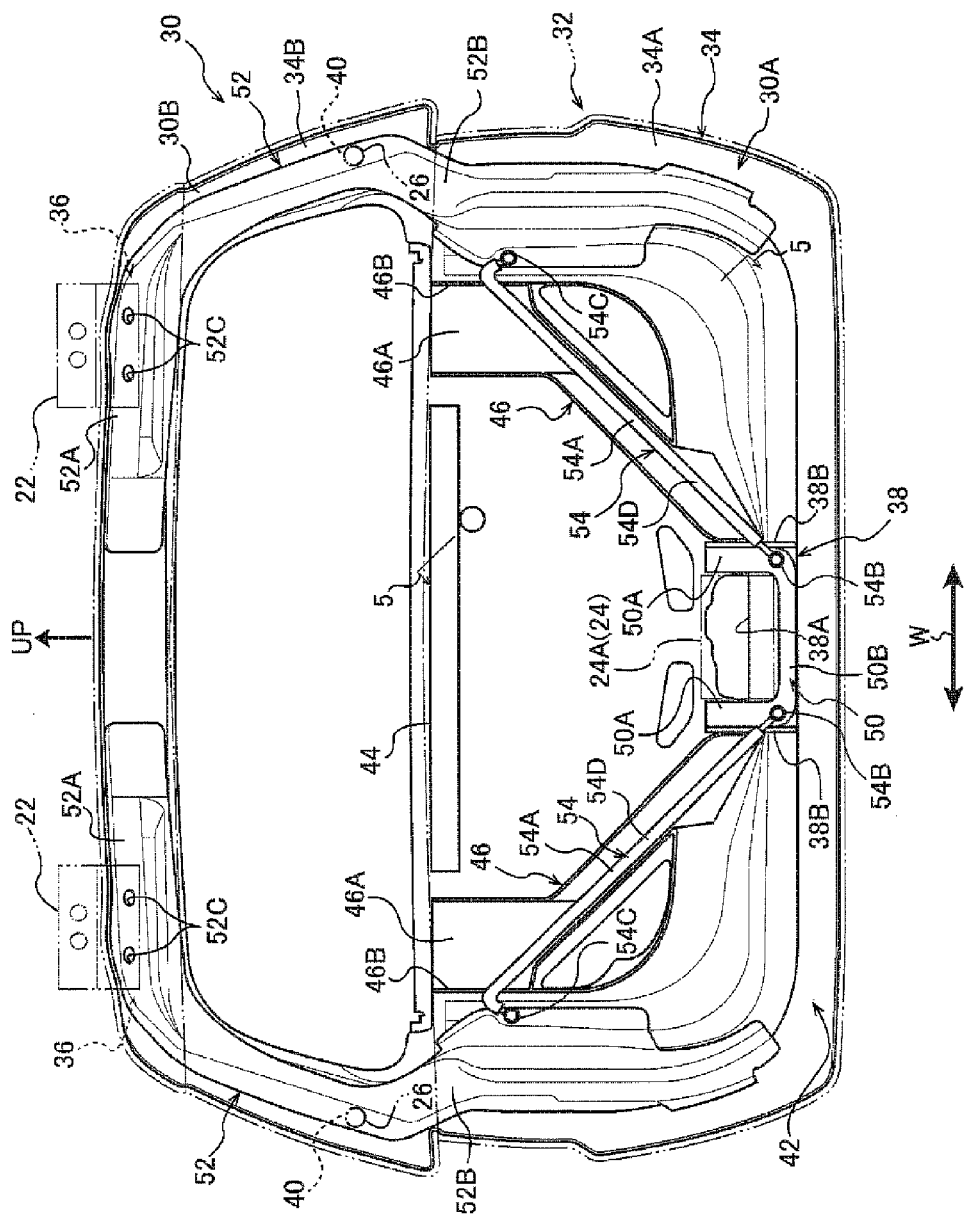
FIG. 2 is an elevational view showing the back door, to which the opening/closing body structure for a vehicle relating to the embodiment of the present invention is applied, in a state of being seen from a vehicle rear side and in a state of seeing-through an outer unit.

An opening/closing body structure for a vehicle relating to an embodiment of the present invention is described by using FIG. 1 through FIG. 7D. Note that arrow FR that is shown appropriately in these drawings indicates the vehicle front side, arrow UP indicates the vehicle upper side, and arrow W indicates the vehicle transverse direction. Further, a door transverse direction (door left-right direction) of a back door 30 is the same direction as the vehicle transverse direction.

A vehicle rear portion 10 of an automobile is shown in a perspective view in FIG. 1. As shown in FIG. 1, at the vehicle rear portion 10, a back door opening portion 12 (also called "rear gate"), that serves as a vehicle body opening portion and that opens rearwardly in the vehicle longitudinal direction, is formed, and the back door 30, that serves as an opening/closing body for opening and closing this back door opening portion 12, is provided. Rear pillars 14 stand at both sides of the back door opening portion 12. A rear roof header portion 16 is disposed substantially along the vehicle transverse direction at the upper edge side of the back door opening portion 12, and a lower back portion 18 is disposed substantially along the vehicle transverse direction at the lower edge side of the back door opening portion 12.

The back door 30 has a back door main body portion 30A at the lower portion of the door, and has a back door frame portion 30B at the upper portion of the door. A back door window glass 32B (also called "rear glass") that is described later is installed in the back door frame portion 30B. The upper end portion of the back door 30 is the base end portion that is the side that is mounted to the vehicle body, and the left and right both sides of the upper end portion are mounted to the rear roof header portion 16 at the vehicle body upper portion by door hinges 22. The door hinges 22, that connect the back door 30 and the roof header portion 16, have hinge shafts (not illustrated) whose axial directions are the vehicle transverse direction. Due to the back door 30 being rotated and moved around the hinge shafts of the door hinges 22, the back door 30 can open and close the back door opening portion 12. Namely, the back door 30 can move between a closed position (the state of FIG. 1) at which the back door 30 closes the back door opening portion 12, and an open position (not illustrated) at which the back door 30 opens the back door opening portion 12.

The vehicle transverse direction intermediate portion of the lower end portion (the free end portion at the side opposite the side that is mounted to the vehicle body) of the back door 30 is anchored to the vehicle body lower portion by a door lock mechanism 24. The door lock mechanism 24 has a lock mechanism portion 24A that is mounted to the back door 30 side, and a striker 24B that is mounted to the lower back portion 18 side. The lock mechanism portion 24A can be anchored on the striker 24B. Due to the lock mechanism portion 24A being anchored on the striker 24B, the back door 30 is maintained in a closed state.

Further, dampers 26 are mounted to the vehicle transverse direction both end portions of the vertical direction intermediate portion of the back door 30. The pair of dampers 26 are structured by cylinders, that are mounted to the lower portion sides of the both sides of the back door frame portion 30B, and pistons, that are freely pulled-out and inserted-into the cylinders and are mounted to the vertical direction intermediate portion side at the both side portions of the back door opening portion 12. In the closed state of the back door 30, the dampers 26 urge the vehicle transverse direction both end portions of the vertical direction intermediate portion of the back door 30 toward the vehicle cabin outer side (a direction including a vehicle rear side component, the arrow A direction in the present embodiment), and extend while rotating and moving in accordance with the degree of opening of the back door 30. Further, due to the dampers 26 extending, the opening operation force of the back door 30 is reduced, and the open state is maintained.

The back door 30 is shown in FIG. 2 in an elevational view that is in a state of being viewed from the vehicle rear side and in a state of seeing-through an outer unit 32 that is shown by the two-dot chain lines. The back door 30 is shown in an exploded elevational view in FIG. 3, and the back door 30 is shown in a side view in FIG. 4. As shown in these drawings, the back door 30 is structured to include the outer unit 32 that is disposed at the door outer side (the vehicle cabin outer side), and a door inner panel 34 that is disposed at the door inner side (the vehicle cabin inner side).

Figure 3:
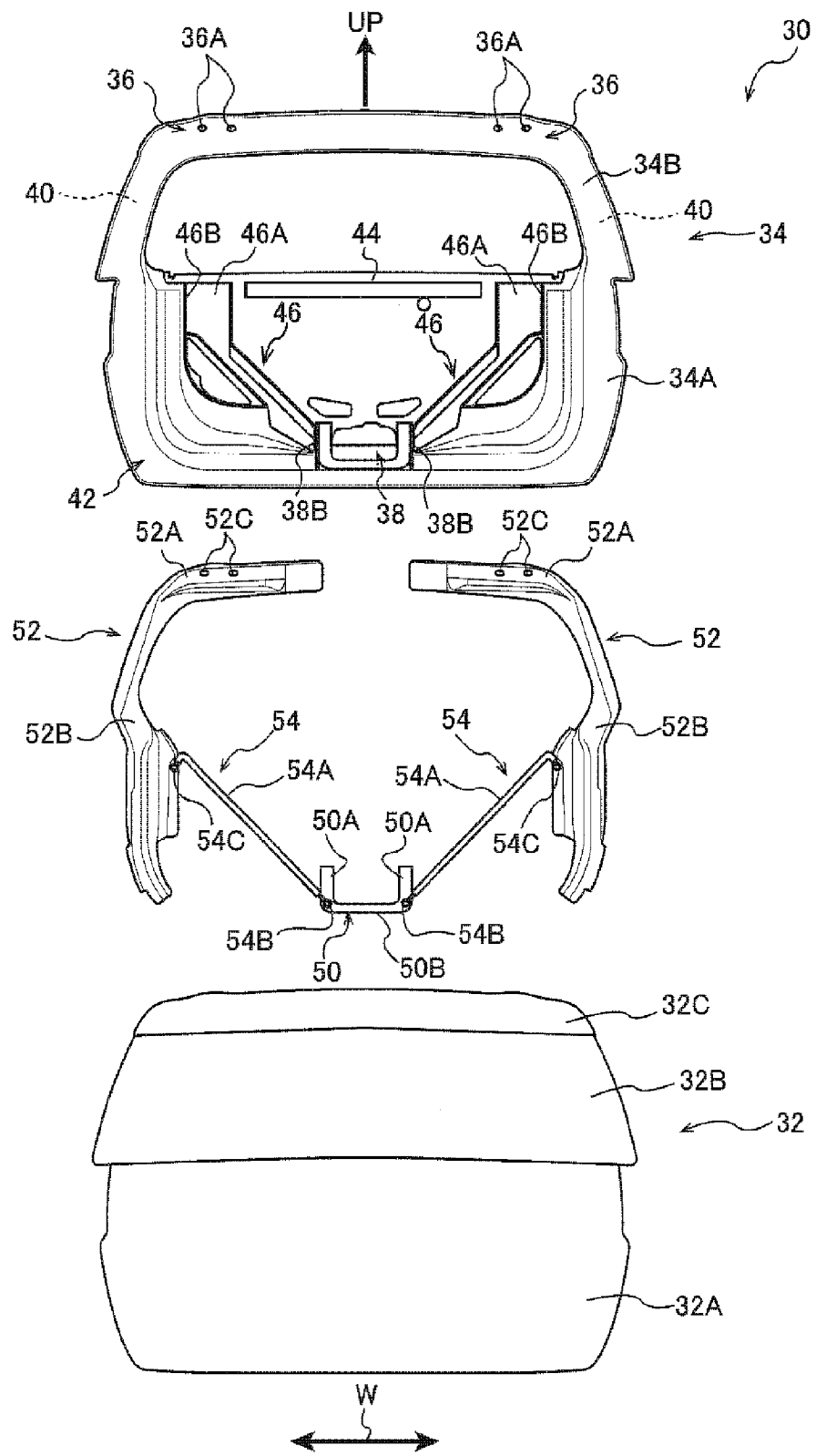
FIG. 3 is an exploded elevational view showing, in an exploded manner, the back door to which the opening/closing body structure for a vehicle relating to the embodiment of the present invention is applied.
Figure 4:
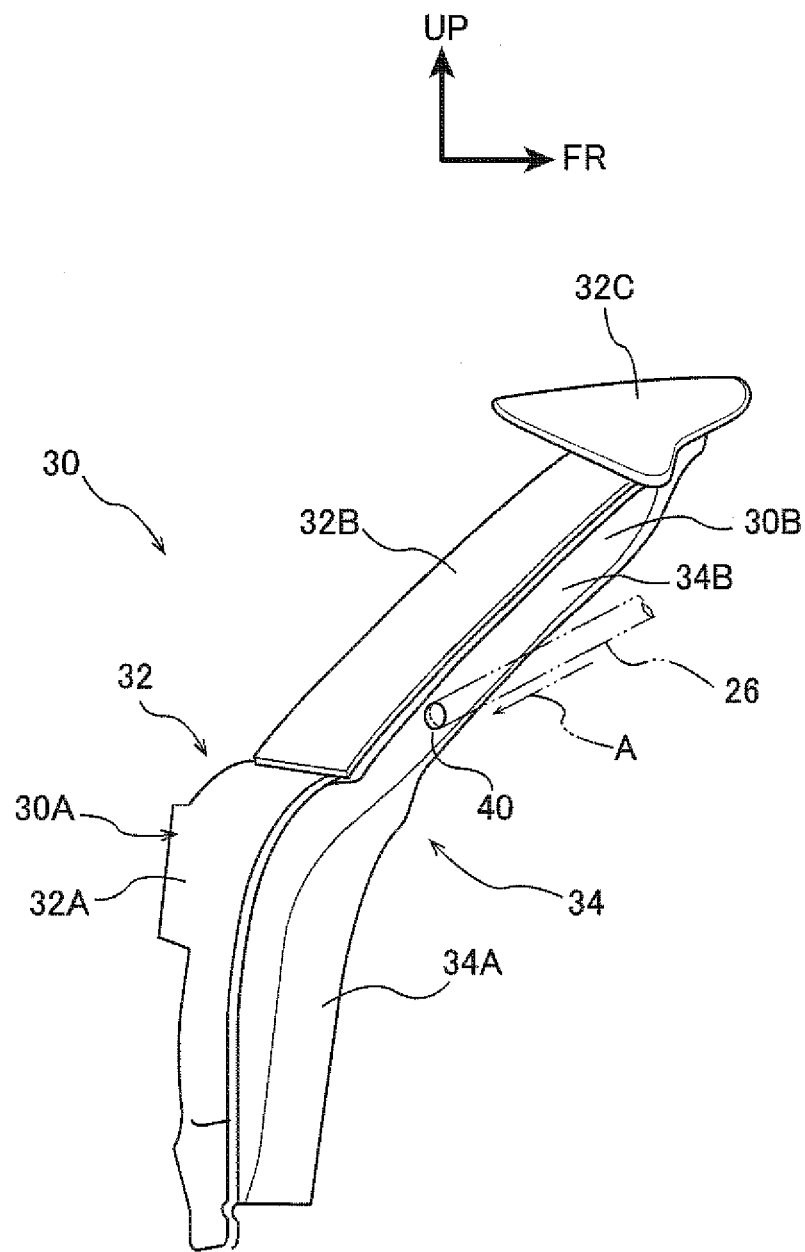
FIG. 4 is a side view showing the back door to which the opening/closing body structure for a vehicle relating to the embodiment of the present invention is applied.

As shown in FIG. 3 and FIG. 4, the outer unit 32 is structured to include a door outer panel 32A that is made of resin, the back door window glass 32B, and a rear spoiler 32C that is made of resin. The door outer panel 32A structures the outer plate (the door outer side portion) of the back door main body portion 30A (see FIG. 4) at the back door 30, and is disposed at the lower portion of the back door 30. Further, the back door window glass 32B is adhered to the upper end portion of the door outer panel 32A, and is disposed at the upper portion of the back door 30. Moreover, the rear spoiler 32C is adhered to the upper end portion of the back door window glass 32B, and is disposed at the upper end portion of the back door 30.

In contrast, the door inner panel 34 is made of resin and structures the inner plate (the door inner side portion) of the back door 30. The door inner panel 34 has a door inner panel main body portion 34A that structures the inner plate of the back door main body portion 30A (see FIG. 4), and a door inner panel frame portion 34B that structures the back door frame portion 30B (see FIG. 1). The door inner panel 34 and the outer unit 32 are disposed so as to face one another, and the outer peripheral edge portions thereof are joined together by an adhesive. The back door 30 relating to the present embodiment is a back door that is made of resin, which is advantageous in terms of lightening the weight.

As shown in FIG. 3, an annular bead 42 is formed at the door inner panel 34 so as to circle the outer peripheral portion thereof. The annular bead 42 is formed in a shape that is concave toward the door outer side (a shape that is convex toward the vehicle cabin inner side). Further, a lateral bead 44 that extends in the vehicle transverse direction is formed at the lower side of the back door window glass 32B at the vertical direction intermediate portion of the door inner panel 34. The lateral bead 44 is formed in a shape that is concave toward the door outer side (a shape that is convex toward the vehicle cabin inner side).

Moreover, a pair of left and right connecting beads 46, that connect regions that are positioned at the vehicle transverse direction outer sides with respect to the lateral bead 44 and the vehicle transverse direction intermediate portion of the panel lower end portion (a lock mechanism mounting portion 38 that is described later), are formed at the door inner panel 34. At the connecting beads 46, upper end portions 46A, that are positioned at the vehicle transverse direction outer sides with respect to the lateral bead 44, are disposed at positions that are apart from the lateral bead 44, and are connected to the annular bead 42. The pair of connecting beads 46 are formed in shapes that are concave toward the door outer side (shapes that are convex toward the vehicle cabin inner side). Further, outer-side side wall portions 46B, that are the vehicle transverse direction outer sides at the upper end portion 46A sides of the connecting beads 46, are made integral with (also function as) the wall portion at the inner peripheral side of the annular bead 42.

Further, at the upper end portion of the door inner panel 34 (the door inner panel frame portion 34B), the regions that are toward the vehicle transverse direction both end portions are made to be a pair of left and right door hinge mounting portions 36, and the aforementioned door hinges 22 (see FIG. 2) are mounted thereto. Bolt insert-through holes 36A are formed in the door hinge mounting portions 36. The upper end portions of hinge reinforcements 52 (refer to the middle drawing in FIG. 3) that serve as second reinforcing bodies are superposed on the vehicle rear sides of the door hinge mounting portions 36.

The pair of left and right hinge reinforcements 52 are made of metal (e.g., made of steel), and are reinforcing members that have high strength and high rigidity and are bent in substantial L-shapes as seen in an elevational view. These hinge reinforcements 52 are fixed by the fastening of bolts (not illustrated) to regions, at the outer peripheral portion of the door inner panel 34 along the annular bead 42, from the left and right upper end portions to the lower portions of the vehicle transverse direction outer side end portions. Namely, the hinge reinforcements 52 have upper end reinforcing portions 52A that reinforce the door hinge mounting portions 36 at the left and right upper end portions of the door inner panel 34, and side reinforcing portions 52B that extend toward the door lower side from the end portions at the vehicle transverse direction outer sides of the upper end reinforcing portions 52A, and that are provided at the left and right both end portions sides of the back door 30 (the both end portions sides in the direction orthogonal to the direction heading from the base end portion side toward the free end portion side), and reinforce the left and right both end portion sides of the door inner panel 34.

Bolt insert-through holes 52C are formed in the upper end portions of the hinge reinforcements 52 at regions corresponding to the bolt insert-through holes 36A of the door hinge mounting portions 36. Further, the door hinges 22 (see FIG. 2) are fastened to the door inner panel 34 and the hinge reinforcements 52 by bolts (not illustrated) or the like that are inserted-through the bolt insert-through holes 36A, 52C.

In contrast, as shown in FIG. 2, the vehicle transverse direction intermediate portion of the lower end portion of the door inner panel 34 (the door inner panel main body portion 34A) is made to be the lock mechanism mounting portion 38 to which the aforementioned lock mechanism portion 24A is mounted. A hole 38A for wires is formed so as to pass-through the lock mechanisms mounting portion 38. A pair of left and right side wall portions 38B, for mounting a lock reinforcement 50 that serves as a first reinforcing body, are formed at the lock mechanism mounting portion 38. The side wall portions 38B are provided so as to be continuous with the lower ends of the connecting beads 46.

The lock reinforcement 50 is made of metal (e.g., made of steel), and is a reinforcing member that has high strength and high rigidity, and is bent into a substantial U-shape in an elevational view, and has a pair of left and right vertical wall portions 50A and a lower wall portion 50B. This lock reinforcement 50 is disposed between the pair of side wall portions 38B, and is fixed to the lower end portion of the door inner panel 34 (the free end portion side of the back door 30) due to the vertical wall portions 50A being fixed by fastening of bolts or the like to the side wall portions 38B, and reinforces the lock mechanism mounting portion 38 at the door inner panel 34.

Further, at the both vehicle transverse direction end portions of the vertical direction intermediate portion of the door inner panel 34, the surfaces that face the vehicle cabin inner side (the surfaces at the side opposite the surfaces shown in FIG. 2) are made to be damper mounting portions 40 (see FIG. 4). As shown in FIG. 4, the aforementioned dampers 26 are mounted to the damper mounting portions 40.

On the other hand, as shown in FIG. 2, the lock reinforcement 50 and the hinge reinforcements 52 are connected by wires 54. The wire 54 has a wire main body portion (wire rope) 54A that is elongated, and mounting portions 54B, 54C for bolt fastening that are provided at the both length direction end portions of this wire main body portion 54A, and the wire 54 has a predetermined tensile strength. Note that the wire main body portion 54A is structured by a protective material being covered on the outer peripheral side of an inner cable in which plural wire materials are twisted together (detailed illustration is omitted).

Figure 5:
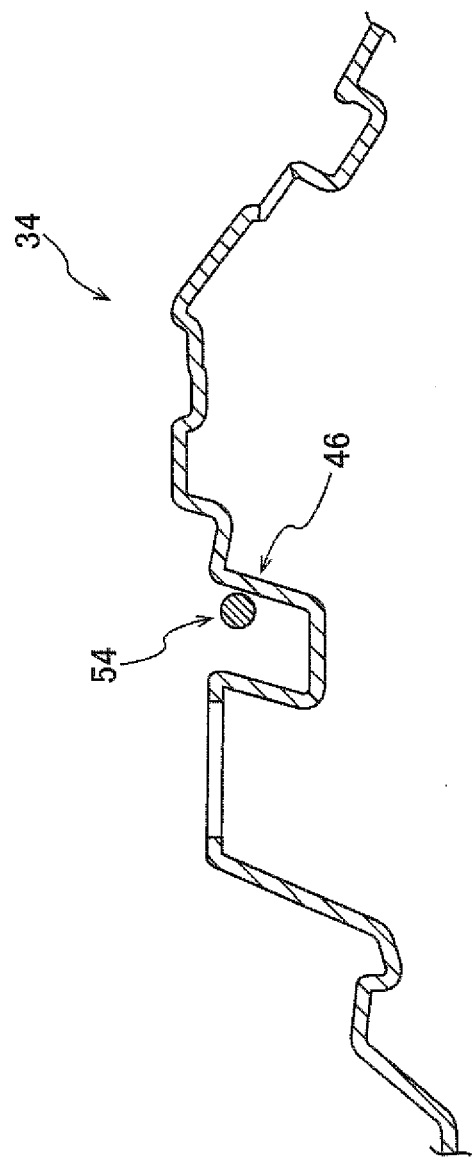
FIG. 5 is an enlarged sectional view shown in a state cut along line 5-5 of FIG. 2.

At the wire 54 that is structured in this way, the mounting portion 54B at the one end side is fixed by fastening by bolts to the lower portion of the vertical wall portion 50A of the lock reinforcement 50, and the mounting portion 54C at the other end side is fixed by fastening by bolts to the vertical direction intermediate portion of the hinge reinforcement 52, and the wire 54 is tensed rectilinearly. Further, the majority of the wire 54 extends along the connecting bead 46, and is disposed within the concave shape of the connecting bead 46 as shown in FIG. 5 that is an enlarged sectional view along line 5-5 of FIG. 2. Note that, in the present embodiment, as shown in FIG. 2, the upper end portion (the other end portion) side of the wire 54 crosses-over the outer-side side wall portion 46B of the connecting bead 46 at the door inner panel 34, and therefore, is bent at this portion that crosses-over, but the wire 54 is tensed rectilinearly other than at this portion that crosses-over.

Further, with regard to the positional relationship between the wires 54 and the damper mounting portions 40 of the door inner panel 34, the wires 54 are set such that the damper mounting portions 40 are set substantially on extension lines of rectilinear portions 54D of the wires 54 as seen in an elevational view of the back door 30.

(Operation/Effects of Embodiment)

The operation and effects of the above-described embodiment are described next.

As shown in FIG. 1, the left and right upper end portions of the back door 30 are mounted to the vehicle body upper portion by the door hinges 22, and the vehicle transverse direction intermediate portion of the lower end portion of the back door 30 is anchored to the vehicle body lower portion by the door lock mechanism 24, and, in the closed state, the both vehicle transverse direction end portions of the vertical direction intermediate portion of the back door 30 are urged toward the vehicle cabin outer side (in the arrow A direction) by the dampers 26. Therefore, in the closed state of the back door 30, force that attempts to bendingly deform the door inner panel 34 in a sideways V-shape as seen in a vehicle side view is applied to the door inner panel 34 that structures the inner plate of the back door 30 shown in FIG. 4.

Here, in the present embodiment, as shown in FIG. 2, the pair of left and right hinge reinforcements 52 are fixed to regions, at the outer peripheral portion of the door inner panel 34, from the left and right upper end portions to the lower portions of the vehicle transverse direction outer side end portions, and reinforce the door hinge mounting portions 36 at the left and right upper end portions of the door inner panel 34 and the left and right both side portions of the door inner panel 34. Therefore, bending deformation, in a sideways V-shape as seen in a vehicle side view, of the door inner panel 34 is suppressed.

The lock reinforcement 50 is fixed to the lock mechanism mounting portion 38 at the lower end portion of the door inner panel 34, and reinforces the lock mechanism mounting portion 38. At the wires 54, whose mounting portions 54B at the one end sides are fixed to this lock reinforcement 50, the mounting portions 54C at the other end sides are fixed to the vertical direction intermediate portions of the hinge reinforcements 52, and the wires 54 are tensed rectilinearly. Therefore, the relative positions of the fixed region of the lock reinforcement 50 at the door inner panel 34 and the fixed regions of the pair of left and right hinge reinforcements 52 are maintained by the wires 54. Accordingly, in a case in which the back door 30 is closed and is anchored to the vehicle body lower portion by the door lock mechanism 24, positional offset of the lower end portion of the door inner panel 34 in the vehicle longitudinal direction is suppressed.

Further, in the present embodiment, the damper mounting portions 40 at the door inner panel 34 are set substantially on extension lines of the rectilinear portions 54D of the wires 54 as seen in an elevational view of the back door 30. Therefore, when, in the closed state of the back door 30, tension is applied between the lock mechanism mounting portion 38 and the damper mounting portions 40 at the door inner panel 34 due to the urging forces of the dampers 26, this tension basically is applied along the axial directions of the rectilinear portions 54D of the wires 54 without bypassing through the outer peripheral portion of the door inner panel 34. Therefore, even if the reinforced range of the lower portion side of the door inner panel 34 by the hinge reinforcements 52 is kept small, when the back door 30 is closed and is anchored to the vehicle body lower portion by the door lock mechanism 24, positional offset of the lower end portion of the door inner panel 34 in the vehicle longitudinal direction is suppressed well.

Supplemental description is given here with reference to the graphs of FIG. 6A through FIG. 6F. Each of the graphs shown in FIG. 6A through FIG. 6F illustrates, with respect to a reference position in a case in which an assembly, that is structured by the door inner panel (34) and the outer unit (32), is mounted to the vehicle body rear portion (10) by the door hinges (22) and the door lock mechanism (24), how much the position, in a case in which the above-described assembly is fully equipped with interior parts and the dampers (26) and the like and the back door (30) is closed, is displaced.

The solid lines in the graphs illustrate the results of the back door 30 that is made of resin and to which the opening/closing body structure for a vehicle relating to the present embodiment is applied. The two-dot chain lines in the graphs illustrate the results of a back door that is made of resin and to which a comparative structure is applied. This comparative structure is a structure in which the wires 54 and the connecting beads 46 of the present embodiment are not provided, and the both end portions of a bead that corresponds to the lateral bead 44 are connected to a bead that corresponds to the annular bead 42. Note that this comparative structure is a structure in which the other points are similar to those of the opening/closing body structure for a vehicle relating to the present embodiment.

Figure 6A:
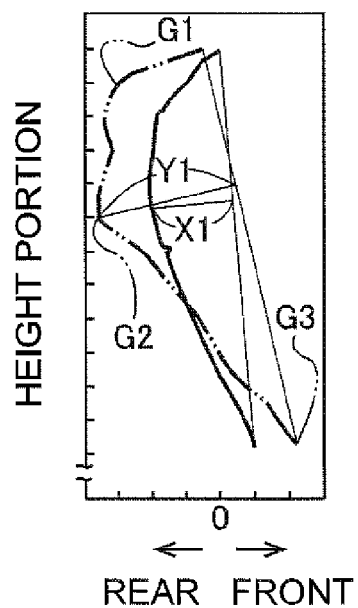
FIG. 6A is a graph for explaining the fitted state of the back door to which the opening/closing body structure for a vehicle relating to the embodiment of the present invention is applied. A height position in a vehicle vertical direction is shown on the vertical axis, and an amount of displacement (amount of offset) in a vehicle longitudinal direction is shown on the horizontal axis.
Figure 6B:
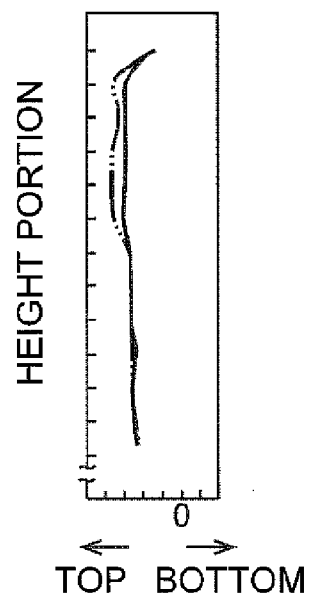
FIG. 6B is a graph for explaining the fitted state of the back door to which the opening/closing body structure for a vehicle relating to the embodiment of the present invention is applied. The height position in the vehicle vertical direction is shown on the vertical axis, and the amount of displacement (amount of offset) in the vehicle vertical direction is shown on the horizontal axis.

The height position in the vehicle vertical direction is shown on the vertical axes of FIG. 6A and FIG. 6B. Further, the amount of displacement (amount of offset) in the vehicle longitudinal direction is shown on the horizontal axis of FIG. 6A, and the amount of displacement (amount of offset) in the vehicle vertical direction is shown on the horizontal axis of FIG. 6B.

As shown in FIG. 6A, at the back door of the comparative structure (refer to the two-dot chain line), an upper side region G1 and an intermediate region G2 in the vertical direction are bent regions, and the back door is deformed in a convex shape toward the vehicle rear direction side. In other words, so-called "two-stage bending", in which the back door bends at the upper side region G1 and the intermediate region G2 in the vertical direction, occurs markedly, and a curve change amount Y1 is great. In contrast, at the back door 30 to which the opening/closing body structure for a vehicle relating to the present embodiment is applied, as shown by the solid line in the graph, the amount of displacement toward the vehicle rear side and so-called "two-stage bending" are suppressed, and a curve change amount X1 is suppressed.

Note that the curve change amount is the maximum amount of the distances from a straight line, that connects both ends of the graph line, along perpendicular lines to points intersecting the graph line. Further, at the back door of the comparative structure (refer to the two-dot chain line), the upper side region G1 (the bent region at the upper side) is a region corresponding to the door hinge mounting portions (36), and the intermediate region G2 in the vertical direction (the bent region at the intermediate region in the vertical direction) is a region corresponding to the damper mounting portions (40).

Further, at the door inner panel of the back door of the comparative structure (refer to the two-dot chain line), in order to suppress poor fitting that is caused by a change in the relative position of the fixed region of the lock reinforcement (50) with respect to the fixed regions of the pair of left and right hinge reinforcements (52), the amount by which a door lower end portion G3 is pulled-in toward the vehicle front side is set to be large (refer to FIG. 6A).

To describe this point further, in the back door of the comparative structure (refer to the two-dot chain line), in the same way as the back door (30) of the present embodiment, the door inner panel is made of resin, and there are no door lower end reinforcing portions that extend in the vehicle transverse direction from the lower end of the lock reinforcement (50) at the left and right lower end portions of the door inner panel. Therefore, the rigidity of the lower portion side of the door inner panel is low. Further, in the back door of the comparative structure (refer to the two-dot chain line), wires (54) such as those of the back door (30) of the present embodiment are not tensed, and therefore, it is easy for the relative position of the fixed region of the lock reinforcement (50) with respect to the fixed regions of the pair of left and right hinge reinforcements (52) to vary. Accordingly, in the case of the back door of the comparative structure (refer to the two-dot chain line), when the amount by which the door lower end portion G3 (refer to FIG. 6A) is pulled-in toward the vehicle front side is suppressed, poor fitting, that is caused by a change in the relative position of the fixed region of the lock reinforcement (50) with respect to the fixed regions of the pair of left and right hinge reinforcements (52), arises. Therefore, the door lower end portion G3 must be locked in a state of being pulled-in greatly toward the vehicle front side.

Further, as shown in FIG. 6A, when the amount by which the door lower end portion G3 is pulled-in is great, the force that is applied to the intermediate region G2 in the vertical direction, that corresponds to the damper mounting portions (40), also is great, and therefore, it is easy for the back door of the comparative structure (refer to the two-dot chain line) to deform in so-called "two-stage bending". In contrast, at the door inner panel 34 of the back door 30 to which the opening/closing body structure relating to the present embodiment is applied, the relative positions of the fixed region of the lock reinforcement 50 and the fixed regions of the pair of left and right hinge reinforcements 52 are maintained by the wires 54. Therefore, fitting of the back door 30 is established well even if the lower end portion of the back door 30 is locked to the vehicle body lower portion with the amount, by which the lower end portion of the back door 30 is pulled-in toward the vehicle front side, being suppressed. Accordingly, this is advantageous in suppressing so-called "two-stage bending" of the back door 30.

Further, as shown in FIG. 6B, with regard to the amount of displacement in the vehicle vertical direction as well, the amount of displacement can be suppressed more in the case of the present embodiment (refer to the solid line) than in the case of the comparative structure (refer to the two-dot chain line).

Figure 6C:
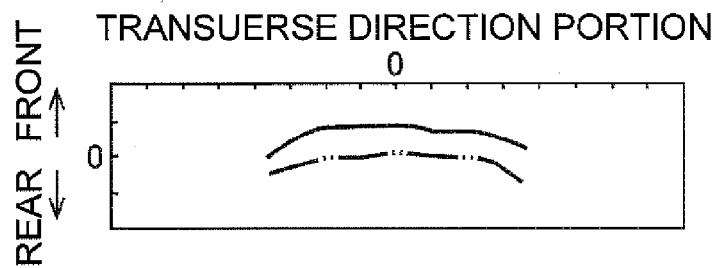
FIG. 6C is a graph for explaining the fitted state of the back door to which the opening/closing body structure for a vehicle relating to the embodiment of the present invention is applied. This is the results of an upper end side of the door, and the amount of displacement (amount of offset) in the vehicle longitudinal direction is shown on the vertical axis, and the position in a vehicle transverse direction is shown on the horizontal axis.
Figure 6D:
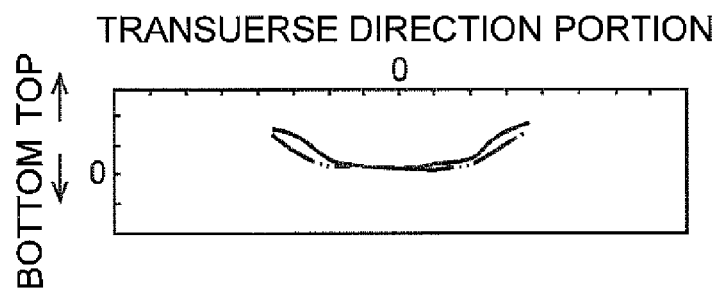
FIG. 6D is a graph for explaining the fitted state of the back door to which the opening/closing body structure for a vehicle relating to the embodiment of the present invention is applied. This is the results of the upper end side of the door, and the amount of displacement (amount of offset) in the vehicle vertical direction is shown on the vertical axis, and the position in the vehicle transverse direction is shown on the horizontal axis.
Figure 6E:
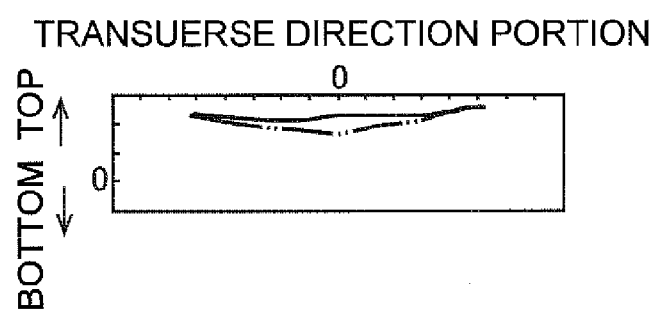
FIG. 6E is a graph for explaining the fitted state of the back door to which the opening/closing body structure for a vehicle relating to the embodiment of the present invention is applied. This is the results of a lower end side of the door, and the amount of displacement (amount of offset) in the vehicle vertical direction is shown on the vertical axis, and the position in the vehicle transverse direction is shown on the horizontal axis.
Figure 6F:
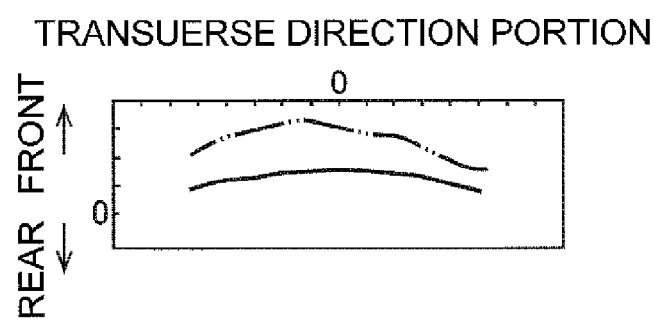
FIG. 6F is a graph for explaining the fitted state of the back door to which the opening/closing body structure for a vehicle relating to the embodiment of the present invention is applied. This is the results of the lower end side of the door, and the amount of displacement (amount of offset) in the vehicle longitudinal direction is shown on the vertical axis, and the position in the vehicle transverse direction is shown on the horizontal axis.

On the other hand, the position in the vehicle transverse direction is shown on the horizontal axes of FIG. 6C, FIG. 6D, FIG. 6E and FIG. 6F. FIG. 6C and FIG. 6D are the results of the door upper end side, and FIG. 6E and FIG. 6F are the results of the door lower end side. Further, the amount of displacement (amount of offset) in the vehicle longitudinal direction is shown on the respective vertical axes of FIG. 6C and FIG. 6F, and the amount of displacement (amount of offset) in the vehicle vertical direction is shown on the respective vertical axes of FIG. 6D and FIG. 6E. As is shown in these graphs, it can be understood that, when viewed generally, the curve change amount is smaller in the case of the present embodiment (refer to the solid line) than in the case of the comparative structure (refer to the two-dot chain line).

As described above, in accordance with the opening/closing body structure for a vehicle relating to the present embodiment, the fitting performance of the back door 30 can be improved. Further, in the present embodiment, because there is no need to reinforce the left and right lower end portions of the door inner panel 34, and the like, by reinforcements made of metal, lightening of the weight and lowering of costs can be devised.

Further, the opening/closing operability, the water leakage suppressing performance, and the like as well can be improved. These points are described further hereinafter.

First, the opening/closing operability of the back door 30 shown in FIG. 1 is explained. In a case in which the lower portion of the back door 30 receives operation force from a user at the time of opening/closing the back door 30, this operation force is transmitted from the lock reinforcement 50 shown in FIG. 2 via the rectilinear wires 54 to the hinge reinforcements 52. Therefore, the door inner panel 34, that is reinforced by the lock reinforcement 50 and the hinge reinforcements 52, rotates and moves immediately in response to the operation force by the user. In other words, when compared with the above-described comparative structure that does not have the wires (the comparative structure described in FIG. 6A through FIG. 6F), in the present embodiment, the operation sensitivity of the back door 30 improves because the operation force is transmitted over a short distance (in other words, rectilinearly without bypassing).

Next, the water leakage suppressing performance of the back door 30 is explained with reference to the graphs of FIG. 7A through FIG. 7D. Each of the graphs shown in FIG. 7A through FIG. 7D illustrates, with respect to a reference position in a case in which an assembly, that is structured by the door inner panel (34) and the outer unit (32), is mounted to the vehicle body rear portion (10) by the door hinges (22) and the door lock mechanism (24), how much the outer peripheral sealed surface of the door inner panel (34) is displaced with respect to the back door opening portion (12) in a case in which the above-described assembly is fully equipped with interior parts and the dampers (26) and the like and the back door (30) is closed.

The solid lines in the graphs illustrate the results of the back door 30 that is made of resin and to which the opening/closing body structure for a vehicle relating to the present embodiment is applied. The two-dot chain lines in the graphs illustrate the results of a back door that is made of resin and to which the above-described comparative structure (a comparative structure that is the same as the comparative structure described in FIG. 6A through FIG. 6F) is applied.

Figure 7A:
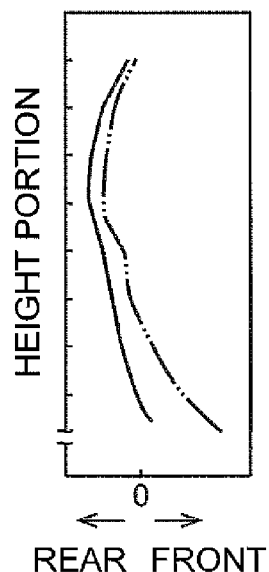
FIG. 7A is a graph for explaining the amount of displacement of a sealed surface of the back door to which the opening/closing body structure for a vehicle relating to the embodiment of the present invention is applied. This is a graph for a left side edge portion of the door, and the height position in the vehicle vertical direction is shown on the vertical axis, and the amount of displacement (amount of offset) in the vehicle longitudinal direction is shown on the horizontal axis.
Figure 7B:
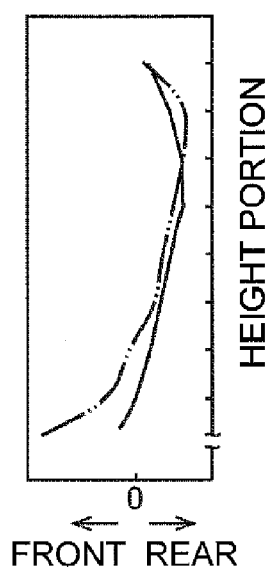
FIG. 7B is a graph for explaining the amount of displacement of the sealed surface of the back door to which the opening/closing body structure for a vehicle relating to the embodiment of the present invention is applied. This is a graph for a right side edge portion of the door, and the height position in the vehicle vertical direction is shown on the vertical axis, and the amount of displacement (amount of offset) in the vehicle longitudinal direction is shown on the horizontal axis.
Figure 7C:
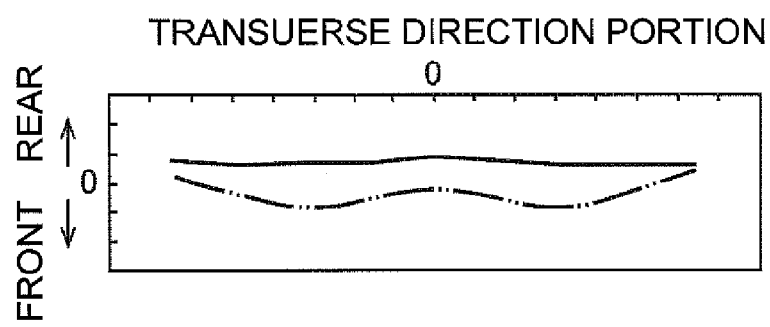
FIG. 7C is a graph for explaining the amount of displacement of the sealed surface of the back door to which the opening/closing body structure for a vehicle relating to the embodiment of the present invention is applied. This is a graph for an upper side edge portion of the door, and the position in the vehicle transverse direction is shown on the horizontal axis, and the amount of displacement (amount of offset) in the vehicle longitudinal direction is shown on the vertical axis.
Figure 7D:
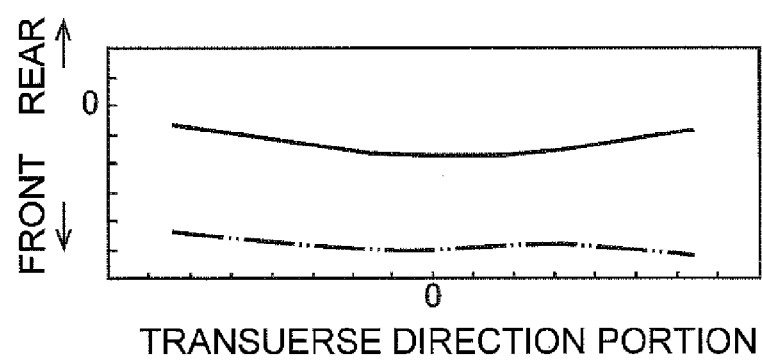
FIG. 7D is a graph for explaining the amount of displacement of the sealed surface of the back door to which the opening/closing body structure for a vehicle relating to the embodiment of the present invention is applied. This is a graph for a lower side edge portion of the door, and the position in the vehicle transverse direction is shown on the horizontal axis, and the amount of displacement (amount of offset) in the vehicle longitudinal direction is shown on the vertical axis.

FIG. 7A is a graph for the door left side edge portion, FIG. 7B for the door right side edge portion, FIG. 7C for the door upper side edge portion, and FIG. 7D for the door lower side edge portion. In FIG. 7A and FIG. 7B, the height position in the vehicle vertical direction is shown on the vertical axes, and the amount of displacement (amount of offset) in the vehicle longitudinal direction is shown on the horizontal axes. Further, in FIG. 7C and FIG. 7D, the position in the vehicle transverse direction is shown on the horizontal axes, and the amount of displacement (amount of offset) in the vehicle longitudinal direction is shown on the vertical axes.

As shown in FIG. 7A through FIG. 7D, when compared with the above-described comparative structure that does not have the wires, the amount of displacement of the sealed surface is suppressed in the present embodiment. This is because the relative positions between the fixed region of the lock reinforcement 50 and the fixed regions of the pair of left and right hinge reinforcements 52 at the door inner panel 34 are maintained by the wires 54. Further, in the case of the present embodiment, the water leakage suppressing performance improves due to the amount of displacement of the sealed surface being suppressed.

By the way, as another effect of the present embodiment, separating of parts at the time of a collision also is prevented or effectively suppressed by the wires 54 that are shown in FIG. 2. Here, because the wires 54 are tensed rectilinearly, this is a structure that is advantageous with respect to preventing the separating of parts even when compared with, for example, a comparative structure in which wires are set along the outer peripheral portions of the door inner panel and the door outer panel.

(Supplementary Description of Embodiment)

Note that, although the opening/closing body for a vehicle is made to be the back door 30 in the above-described embodiment, the opening/closing body for a vehicle may be another opening/closing body for a vehicle such as a luggage door that can open and close a luggage door opening portion (a vehicle body opening portion) at the rear portion of a vehicle body, a side door that can open and close a side door opening portion (a vehicle body opening portion) at the side portion of a vehicle body, a hood that can open and close a vehicle body opening portion at the front portion of a vehicle body, or the like.

Note that supplemental description of the structure in a case in which the opening/closing body is a hood is given here. A hood that serves as an opening/closing body has a hood inner panel that serves as a door inner panel that structures the inner plate of the hood. The left and right both sides of the rear end portion (the base end portion) of the hood are respectively mounted to apron upper members, that structure side portions of the front portion of the vehicle body, via hood hinges that serve as door hinges. The vehicle transverse direction intermediate portion of the front end portion (the free end portion) of the hood is anchored to a radiator support upper member side at the front end portion of the vehicle body, by a hood lock mechanism that serves as a door lock mechanism. A hood lock reinforcement serving as the first reinforcing body is fixed to the front end portion of the hood inner panel. The hood lock reinforcement is a reinforcing member that has high strength and high rigidity, and reinforces the mounting portion of the hood lock mechanism at the hood inner panel. Further, hood hinge reinforcements serving as the second reinforcing bodies are fixed to the both end portion sides in the vehicle transverse direction of the hood inner panel (the both end portion sides in the direction orthogonal to the direction heading from the base end portion side toward the free end portion side). The pair of left and right hood hinge reinforcements are reinforcing members that have high strength and high rigidity and are disposed along the hood longitudinal direction (the vehicle longitudinal direction), and reinforce the mounting portions of the hood hinges at the hood inner panel. Further, one end portions of wires are fixed to the hood lock reinforcement. The other end portions of the wires are fixed to the intermediate portions, in the hood longitudinal direction, of the hood hinge reinforcements, and the wires are tensed rectilinearly. The opening/closing body structure for a vehicle may be a hood structure such as described above.

Further, in the above-described embodiment, the upper end portion (other end portion) sides of the wires 54 cross-over the outer-side side wall portions 46B of the connecting beads 46 at the door inner panel 34, and therefore, are bent at these portions that cross-over. However, for example, there may be a structure that does not have these portions that cross-over, and in which the entire wires are tensed rectilinearly.

Further, in the above-described embodiment, the connecting beads 46 are formed at the door inner panel 34, and the majorities of the wires 54 are disposed within the concave shapes of the connecting beads 46. However, a structure in which the connecting beads (46) are not formed at the door inner panel (34) also is possible.

Further, in the above-described embodiment, at the door inner panel 34, the damper mounting portions 40 are set substantially on extension lines of the rectilinear portions 54D of the wires 54 as seen in an elevational view of the back door 30, and this structure is preferable. However, it is also possible for there to be a structure in which, for example, the damper mounting portions (40) of the door inner panel (34) are set at positions that are offset from substantially on the extension lines of the rectilinear portions (54D) of the wires (54) as seen in an elevational view of the back door (30).

Further, the concept of "substantially on extension lines of rectilinear portions of the wires" in the opening/closing body structure for a vehicle relating to the third aspect of the present invention includes, in addition to "on straight lines that are extensions of the rectilinear portions of the wires" as in the above-described embodiment, cases that cannot strictly be said to be on straight lines that are extensions of the rectilinear portions of the wires, but also cases that are of an extent of being slightly offset from these straight lines, and that obtain operation and effects that are substantially similar to those of the case of "on straight lines that are extensions of the rectilinear portions of the wires", and that can be interpreted as being substantially "on straight lines that are extensions of the rectilinear portions of the wires".

Note that the above-described embodiment and plural modified examples can be implemented by being combined appropriately.

Note that the disclosure of Japanese Patent Application No. 2011-221385 is, in its entirety, incorporated by reference into the present Description.

The invention claimed is:

1. An opening/closing body structure for a vehicle, comprising:
    a door inner panel that structures an inner plate of an opening/closing body that can open and close a vehicle body opening portion;
    door hinges that are provided at a base end portion, which is a side mounted to a vehicle body, of the opening/closing body, and that connect the opening/closing body and the vehicle body;
    a door lock mechanism that is provided at a free end portion, which is at a side opposite from the side mounted to the vehicle body, of the opening/closing body, and that anchors the opening/closing body to the vehicle body;
    a first reinforcing body that is provided at the free end portion side of the opening/closing body, and that reinforces a mounting portion of the door lock mechanism at the door inner panel;
    second reinforcing bodies that are provided at both end portions sides, in a direction orthogonal to a direction heading from the base end portion side toward the free end portion side, of the opening/closing body, and that reinforce the both end portion sides of the door inner panel, wherein the second reinforcing bodies are formed integrally from the base end portion to the free end portion; and
    wires having one end portions that are fixed to the first reinforcing body, and other end portions that are fixed to the second reinforcing bodies, and being tensioned rectilinearly, wherein:
    the opening/closing body comprises a back door that can open and close a back door opening portion of a vehicle rear portion, and has left and right upper end portions that are mounted to a vehicle body upper portion by the door hinges, a vehicle transverse direction intermediate portion of a lower end portion thereof being anchored to a vehicle body lower portion by the door lock mechanism, and, in a closed state, vehicle transverse direction both end portions of a vertical direction intermediate portion thereof being urged toward a vehicle cabin outer side by dampers;
    the first reinforcing body comprises a lock reinforcement that is fixed to a lower end portion of the door inner panel;
    the second reinforcing bodies comprise a pair of left and right hinge reinforcements that are fixed to regions from left and right upper end portions to lower portions of vehicle transverse direction outer side end portions at an outer peripheral portion of the door inner panel, and that reinforce mounting portions of the door hinges at left and right upper end portions of the door inner panel; and the other end portions of the wires are fixed to vertical direction intermediate portions of the hinge reinforcements.

2. The opening/closing body structure for a vehicle of claim 1, wherein, at the door inner panel, mounting portions of the dampers are set substantially on extension lines of rectilinear portions of the wires as seen from a front elevational view of the back door.

3. An opening/closing body structure for a vehicle, comprising:

- a door inner panel that structures an inner plate of an opening/closing body that can open and close a vehicle body opening portion;
- door hinges that are provided at a base end portion, which is a side mounted to a vehicle body, of the opening/closing body, and that connect the opening/closing body and the vehicle body;
- a door lock mechanism that is provided at a free end portion, which is at a side opposite from the side mounted to the vehicle body, of the opening/closing body, and that anchors the opening/closing body to the vehicle body;
- a first reinforcing body that is provided at the free end portion side of the opening/closing body, and that reinforces a mounting portion of the door lock mechanism at the door inner panel;
- second reinforcing bodies that are provided at both end portions sides, in a direction orthogonal to a direction heading from the base end portion side toward the free end portion side, of the opening/closing body, and that reinforce the both end portion sides of the door inner panel; and
- wires having one end portions that are fixed to the first reinforcing body, and other end portions that are fixed to the second reinforcing bodies, and being tensioned rectilinearly,
- wherein at the door inner panel, mounting portions of dampers are set substantially on extension lines of rectilinear portions of the wires as seen from a front elevational view of a back door.

4. The opening/closing body structure for a vehicle of claim 3, wherein:

- the opening/closing body comprises the back door that can open and close a back door opening portion of a vehicle rear portion, and has left and right upper end portions that are mounted to a vehicle body upper portion by the door hinges, a vehicle transverse direction intermediate portion of a lower end portion thereof being anchored to a vehicle body lower portion by the door lock mechanism, and, in a closed state, vehicle transverse direction both end portions of a vertical direction intermediate portion thereof being urged toward a vehicle cabin outer side by the dampers;
- the first reinforcing body is a lock reinforcement that is fixed to a lower end portion of the door inner panel;
- the second reinforcing bodies are a pair of left and right hinge reinforcements that are fixed to regions from left and right upper end portions to lower portions of vehicle transverse direction outer side end portions at an outer peripheral portion of the door inner panel, and that reinforce mounting portions of the door hinges at left and right upper end portions of the door inner panel; and
- the other end portions of the wires are fixed to vertical direction intermediate portions of the hinge reinforcements.

* * * * *

UNITED STATES PATENT AND TRADEMARK OFFICE
CERTIFICATE OF CORRECTION

| | | |
|---|---|---|
| PATENT NO. | : 8,991,898 B2 | Page 1 of 1 |
| APPLICATION NO. | : 14/347464 | |
| DATED | : March 31, 2015 | |
| INVENTOR(S) | : Yoshihiro Iwano | |

It is certified that error appears in the above-identified patent and that said Letters Patent is hereby corrected as shown below:

On the Title Page

Please delete item "(73) Assignee: Toyota Jidosha Kabushiki Kaisha, Tokyo (JP)"

and insert --(73) Assignee: Toyota Jidosha Kabushiki Kaisha, Toyota (JP)--

Signed and Sealed this
Ninth Day of June, 2015

Michelle K. Lee
*Director of the United States Patent and Trademark Office*